United States Patent [19]
Bischoff, Jr.

[11] Patent Number: 6,158,882
[45] Date of Patent: Dec. 12, 2000

[54] LED SEMICONDUCTOR LIGHTING SYSTEM

[75] Inventor: A. John Bischoff, Jr., West Allis, Wis.

[73] Assignee: Emteq, Inc., Muskego, Wis.

[21] Appl. No.: 09/108,055

[22] Filed: Jun. 30, 1998

[51] Int. Cl.[7] .................................................. B60Q 1/00
[52] U.S. Cl. ........................ 362/488; 362/545; 362/287; 362/800; 362/249; 362/471
[58] Field of Search .................................... 362/488, 490, 362/489, 543, 544, 545, 249, 235, 251, 800, 250, 287, 471

[56] References Cited

U.S. PATENT DOCUMENTS

| | | | |
|---|---|---|---|
| 5,015,918 | 5/1991 | Copeland | 362/545 |
| 5,103,382 | 4/1992 | Kondo et al. | 362/545 |
| 5,136,483 | 8/1992 | Schoniger et al. | 362/61 |
| 5,150,098 | 9/1992 | Rakow | 340/479 |
| 5,404,282 | 4/1995 | Klinke et al. | 362/249 |
| 5,490,049 | 2/1996 | Montalan et al. | 362/545 |
| 5,526,236 | 6/1996 | Burnes et al. | 362/20 |
| 5,528,474 | 6/1996 | Roney et al. | 362/249 |
| 5,561,346 | 10/1996 | Byrne | 313/512 |
| 5,655,830 | 8/1997 | Ruskouski | 362/240 |
| 6,016,035 | 1/2000 | Eberspacher et al. | 315/82 |

*Primary Examiner*—Thomas M. Sember
*Attorney, Agent, or Firm*—Quarles & Brady LLP; George E. Haas

[57] ABSTRACT

An LED semiconductor lighting system that comprises a lighting apparatus for illuminating vehicle interiors and powered by a source of electrical power provided by or on the vehicle. The lighting apparatus comprises a light tube with an interior space and has a plurality of light emitting diodes and current limiting resistors contained within such interior space of the light tube. The illumination intensity of the light emitting diodes is controlled by a dimming module in electrical contact with the LEDs and electrically connected to the vehicle source of power. An alternative embodiment of the lighting apparatus includes a flexible light tube.

22 Claims, 4 Drawing Sheets

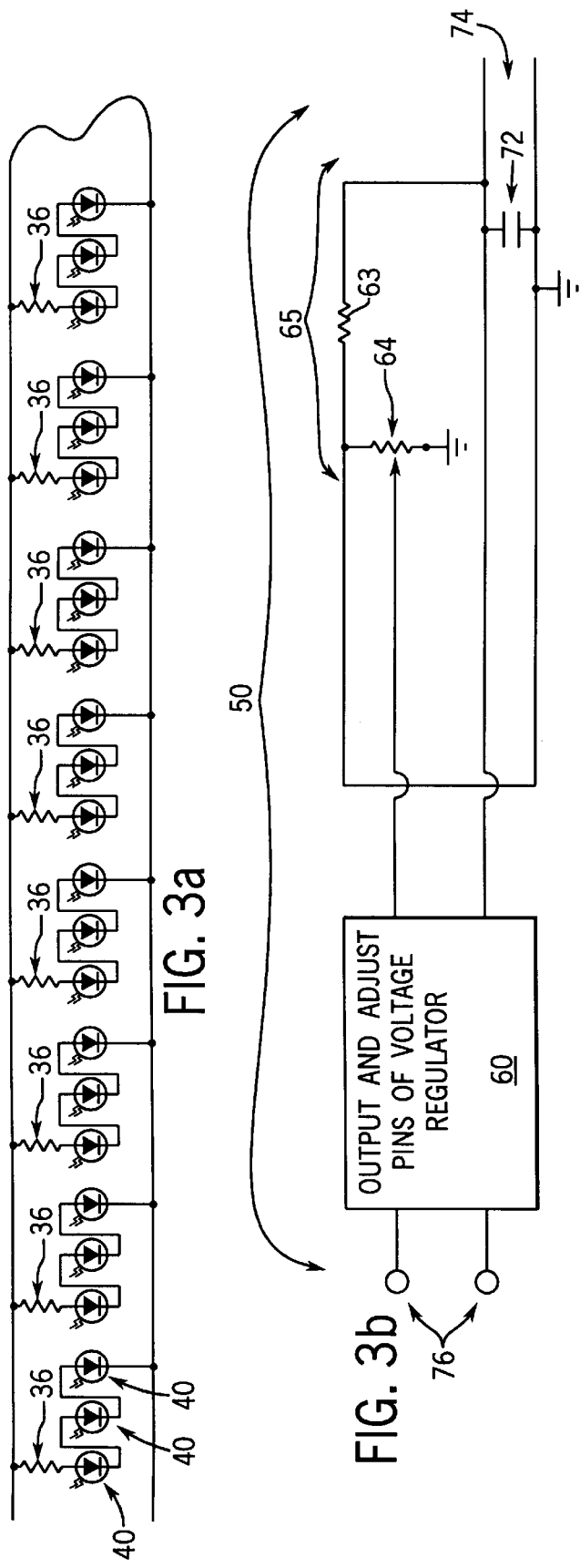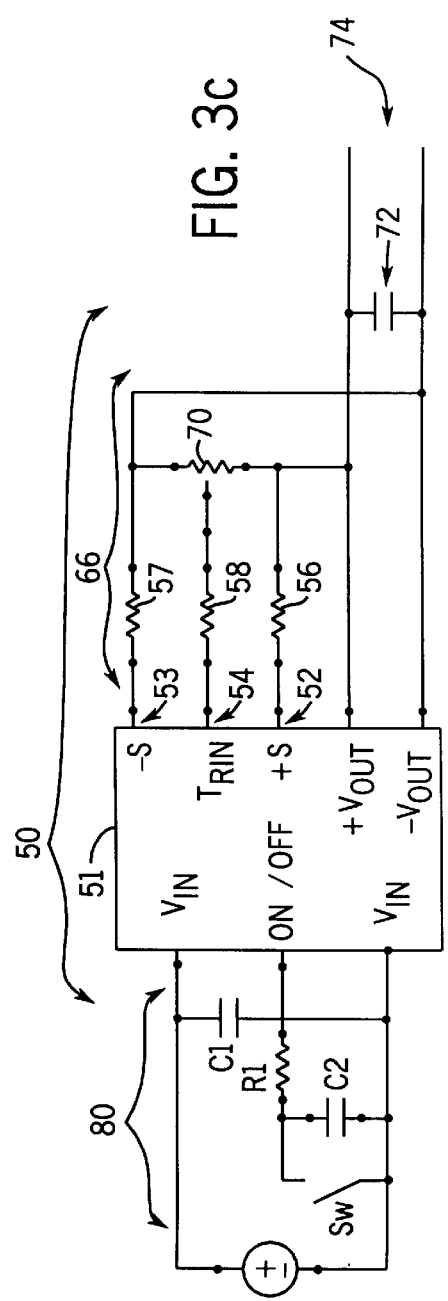

LED SEMICONDUCTOR LIGHTING SYSTEM

FIELD OF THE INVENTION

The present invention relates to semiconductor lighting systems and more particularly to interior lighting of vehicles using dimmable light emitting diodes.

Field of the Invention

Lighting the interior cabins of vehicles such as automobiles, trains and especially aircraft currently use fluorescent and other gas discharge systems or incandescent light systems. Disadvantages of those types of systems include short life time for the light element or bulb, high voltage in the case of gas discharge lighting systems, significant weight, generation of electromagnetic interference and radio frequency interference, heat generation, maintenance costs and fragility of the lighting element or bulb.

One solution that has been used to counter the problems identified above has been to use a light emitting diode (LED), either singularly or in groups. U.S. Pat. No. 5,655,830 to Ruskouski discloses a lighting device with LEDs used in exit signs. That disclosure shows the device using a screw type 20 or bayonet type 65 mounting using standard 120 VAC or backup battery power in an exit sign. U.S. Pat. No. 5,136,483 issued to Schoniger et al discloses a light emitting device for use in a headlamp signal lamp or other lamp for shining light in a beam. The '483 device utilizes LEDs mounted in a circular fashion with the light from the diodes reflected outward in a beam. U.S. Pat. No. 5,561,346 issued to Byrne discloses its use of LEDs in signal lamps. The patent describes the use of a plurality of LEDs in a circular arrangement and mounted to have a parabolic mirror to reflect their light. The teaching of the patent is for signal lights and specifically for traffic control lights and railroad crossing lights. The application does not specify a color for the LED but the teaching tends towards red, yellow and green although white light LED is mentioned in Col. 3, lines 37–45. Color is not claimed.

U.S. Pat. No. 5,528,474 issued to Roney, et al discloses the use of LEDs in the vehicle area, specifically as a taillight or signal light. The LEDs are mounted on a circuit board and then encapsulated in a heat conducting medium. Although color of the LED is not specified, it can be inferred that red and amber are the principal colors for the disclosed uses.

U.S. Pat. No. 5,404,282 issued to Klinke, et al discloses the use of a plurality of LEDs, again in automobiles such as the exterior of an automobile. The method of mounting the diodes is to use a cathode and anode bus bar. (See Col. 3, lines 33–46). The disclosure makes general statements that the invention can be used in interior lighting and applications other than automobiles but it gives no teaching or instruction of such other uses. No mention or claim is made concerning the color of the LEDs used. A considerable amount of disclosure deals with the mounting and attachment techniques for the diodes.

To date the use of LEDs as substitutes for gas discharge or incandescent lights has been limited. As shown above LEDs have been used for external lighting on vehicles or in large outdoor applications. The applied uses have been in relatively large apparatus. In the aircraft industry the use of LEDs as substitute lighting is almost nonexistent. LEDs are used as indicator lights on panels and instruments but not indirect or direct lighting applications. Some of the problems of non-LED lights have been the weight of the devices, short life span of the lighting element, heat dissipation and the generation of electromagnetic interference (EMI) and radio frequency interference (RFI). The latter two problems are especially troublesome in aircraft which require special filtering and insulating elements to avoid or minimize EMI and RFI. That in turn adds weight and uses space both of which are a premium in the interior of an aircraft. Further problems arise because of the relatively short life span of the lighting element, especially in the incandescent light, relating to costs of repair and down time.

SUMMARY OF THE INVENTION

The present invention, which is defined by the claims set out at the end of this disclosure, is intended to solve the problems noted above.

The present invention is a LED semiconductor lighting system that comprises a lighting apparatus for illuminating vehicle interiors and powered by a source of electrical power provided by or on the vehicle. The lighting apparatus comprises a light tube with an interior space and has at least one circuit board channel in which a circuit board is installed. The circuit board, which can be rigid or flexible, having a top side and a bottom side supporting a circuit trace forms a circuit connection. A plurality of light emitting diodes are mounted on the circuit board and are in electrical contact with the circuit trace. Current limiting resistors are also selectively mounted in series with the diodes on the circuit board and in electrical contact with the circuit trace. The illumination intensity of the light emitting diodes is controlled by a dimming module in electrical contact with the circuit trace and electrically connected to the vehicle source of electrical power.

Another embodiment of the present invention provides a plurality of circuit boards with each circuit board electrically interconnected and supporting a light emitting diode all being installed within the light tube of the lighting apparatus.

Another embodiment of the present invention provides a plurality of light emitting diodes and current limiting resistors electrically interconnected and all contained within the interior space of the light tube of the lighting apparatus.

A principal objective of the present invention is to provide a lighting apparatus that will have a full range of dimming capability thereby controlling the illumination intensity of the light emitting diodes within the light tube of the light apparatus.

Another principal objective of the present invention is to provide a lighting apparatus that does not require high currents for power and does not emit high amounts of radiation in the forms of radio frequency interference, electromagnetic interference, or heat.

An additional principal objective of the present invention is to provide a lighting apparatus that can be used in the interior cabins of vehicles, especially aircraft, as direct, or indirect or accent lighting, the intensity of which can be controlled by the operator.

A principal feature of the present invention is that "white light" light emitting diodes are used in a series, parallel combination within a light tube.

Another principal feature of the present invention is that surface mount elements such as light emitting diodes and current limiting resistor are used.

Another feature of the present invention provides the choice of using different light tube geometry to fit the specific application including the ability to use flexible circuit boards and flexible light tubes.

Further advantages, features and objects of the invention will be apparent from the detailed description of the invention in conjunction with the associated drawings and appended claims.

BRIEF DESCRIPTION OF THE DRAWINGS

FIG. 3a is a schematic block diagram of a typical arrangement of light emitting diodes and current limiting resistors in a series-parallel configuration in the lighting apparatus of FIG. 1.

FIG. 3b is a schematic block diagram of the dimming module of the lighting apparatus incorporating a voltage regulator.

FIG. 3c is a schematic block diagram of the dimming module of the light apparatus incorporating a voltage converter electrically connected to a source of electrical power and to a feedback circuit.

Figure 1:
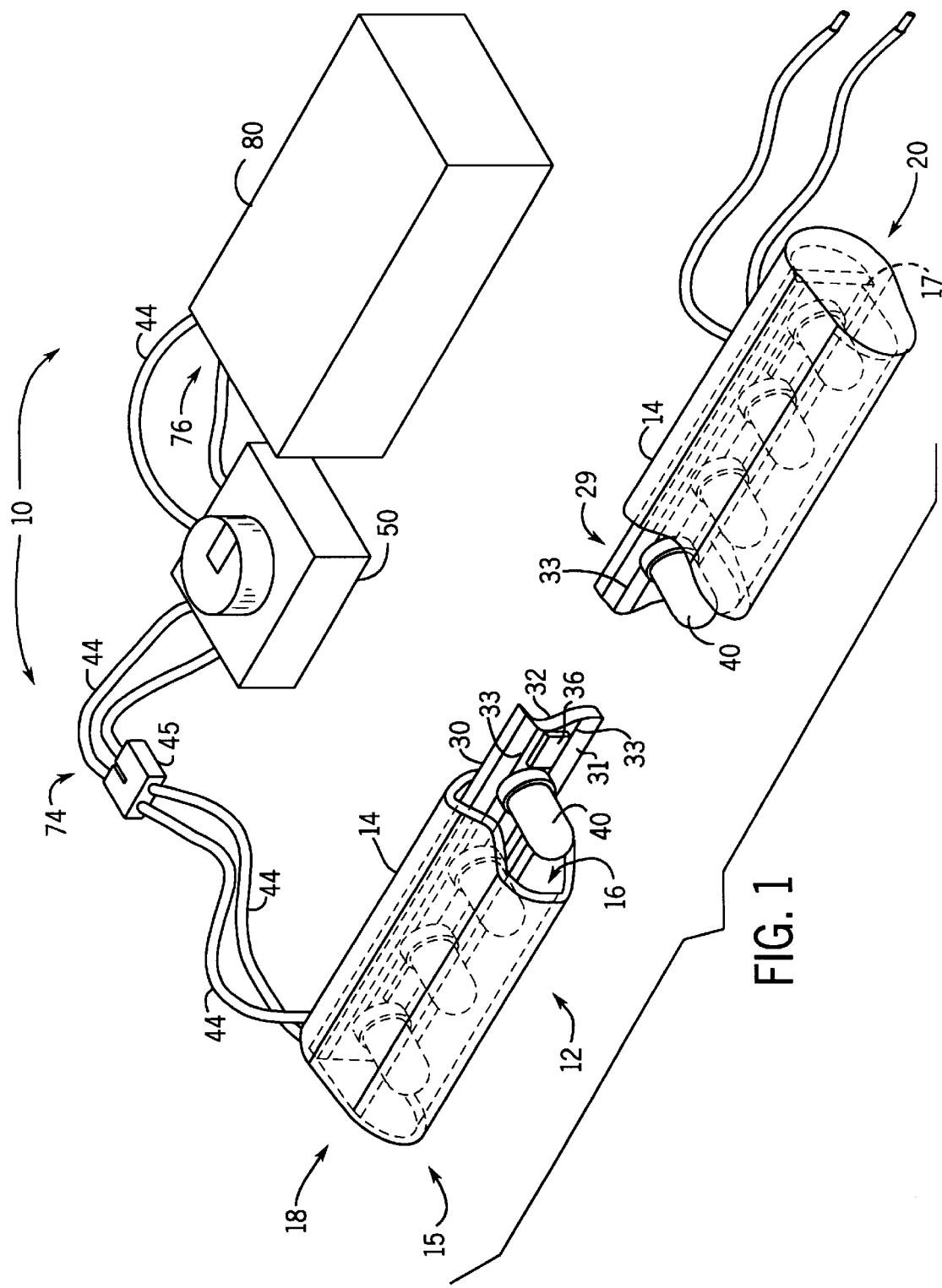
FIG. 1 illustrates the light apparatus of the present invention with an exploded perspective view of a light tube connected to a dimming module and a power supply.

Before explaining the preferred embodiment of the invention in detail, it is to be understood that the invention is not limited in its application to the details of construction and the arrangement of the components set forth in the following description as illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF PREFERRED EMBODIMENT

Figures 4A, 4B:
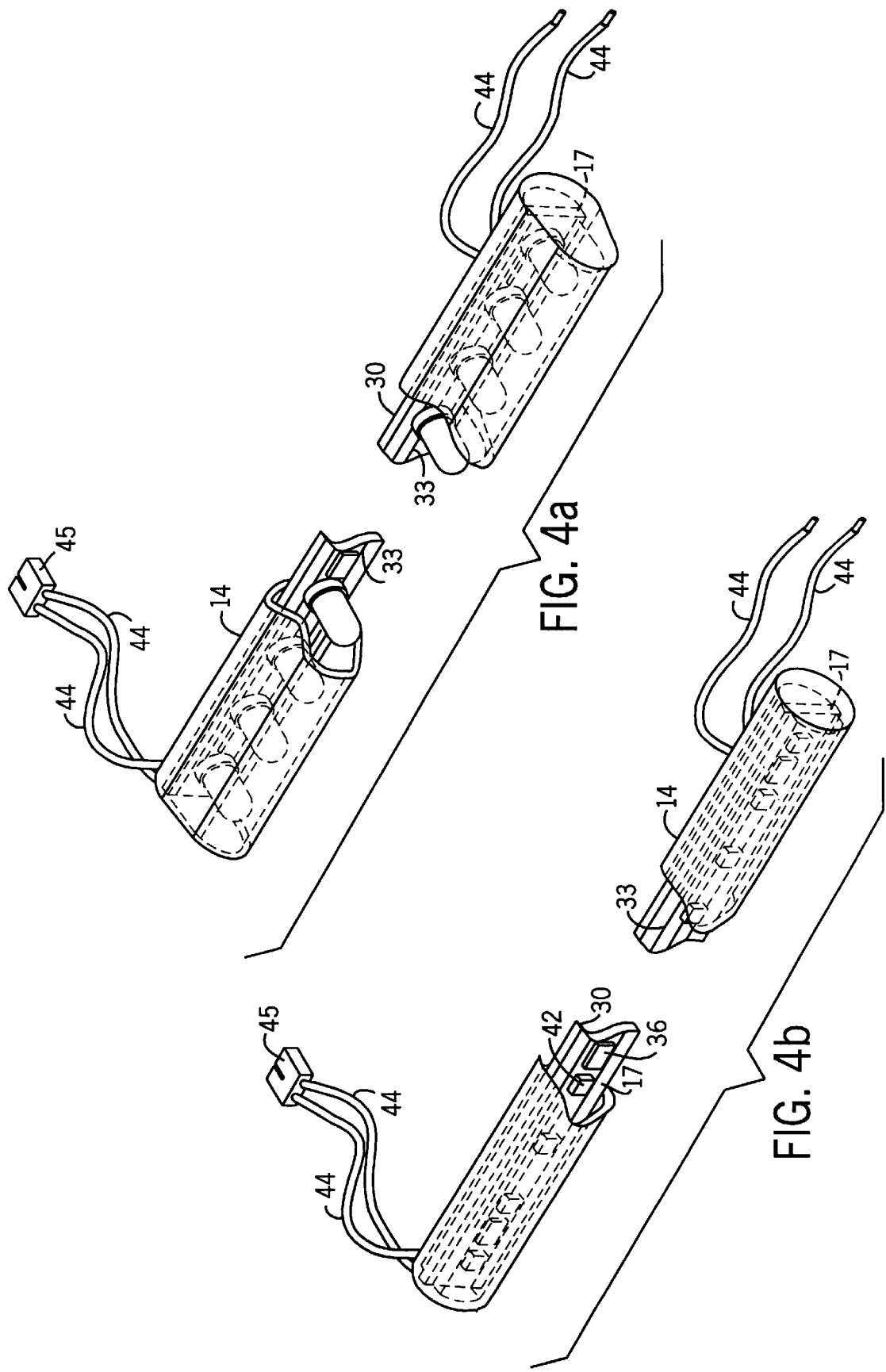
FIG. 4a is an exploded perspective view of the light tube with a rigid circuit board having light emitting diodes and current limiting resistors mounted thereon and installed in a circuit board channel in the interior space of the light tube.
FIG. 4b is an exploded perspective view of the light tube with a circular cross section with a rigid circuit board having the surface mount light emitting diodes and current limiting resistors mounted on the circuit board in electrical contact with circuit traces.

Referring now to FIG. 1, there is shown a lighting apparatus 10 for illuminating vehicle interiors and powered by a source of electrical power provided by or on a vehicle. The lighting apparatus 10 comprises a light tube 12 with an interior space 16. The light tube is an elongated clear or colored envelope 14. The envelope 14 can be made of any material that is transparent or translucent to allow light from light emitting diodes 40 to pass through the envelope with minimal attenuation. The light tube 12 can be flexible to fit in a given application selected by an operator. The main purpose of the light tube 12 envelope 14 is to diffuse the light emitted by the light emitting diodes 40 to give a smooth wash of light. It also is used to direct the light in a certain direction and may be colored or tinted to suit the operator. The light tube may be of any convenient cross-section geometry such as depicted in FIGS. 4a, an elongated oval and FIG. 4b, a circle. The interior space 16 may have a circuit board channel 17 for engaging a circuit board 29 which may be a rigid circuit board 30 or a flexible circuit board 35. The circuit board 29 shown in FIG. 1 is the rigid circuit board 30 and is installed in the circuit board channel 17 in the interior space 16 of the light tube 12.

Figure 2C:
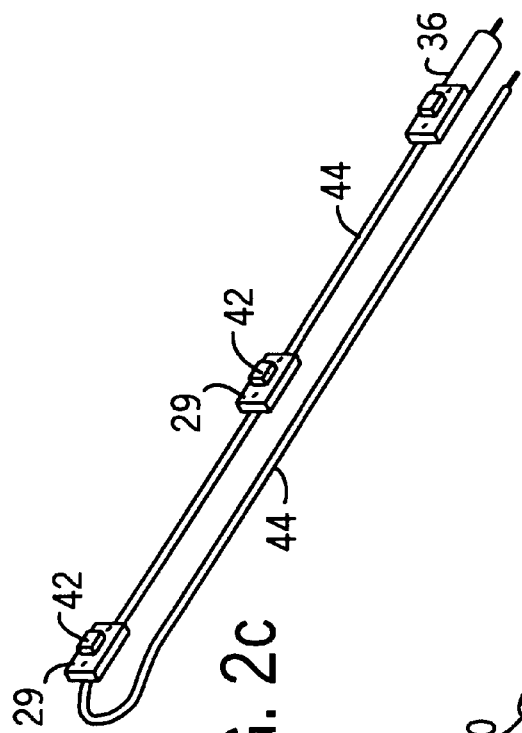
FIG. 2c is a perspective view of a plurality of circuit boards with light emitting diodes of the surface mount type mounted thereon and a current limiting resistor all electrically interconnected and arranged to be installed in the light tube of the lighting apparatus.
Figure 2D:
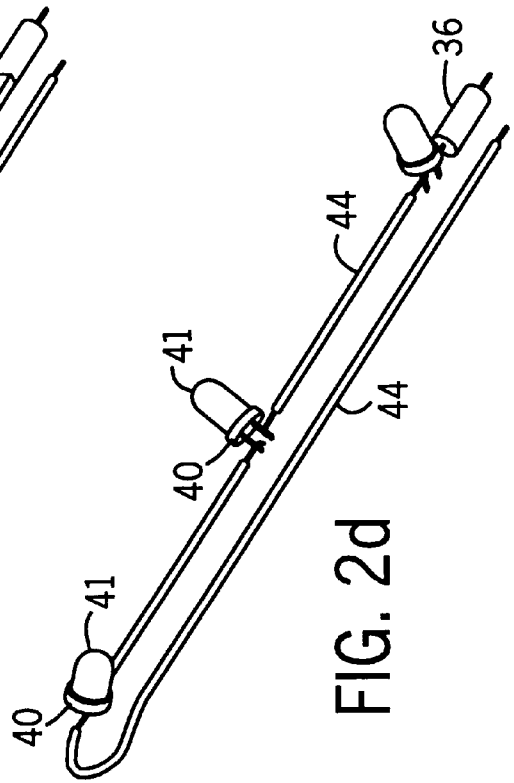
FIG. 2d is a perspective view of a plurality of light emitting diodes electrically interconnected with a current limiting resistor in series and arranged to be installed in the light tube of the lighting apparatus.
Figure 2B:
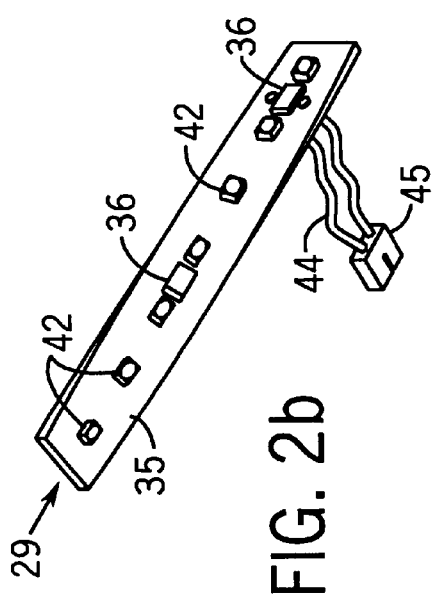
FIG. 2b is a perspective view of a flexible circuit board with light emitting diodes and current limiting resistors mounted on one said board.
Figure 2A:
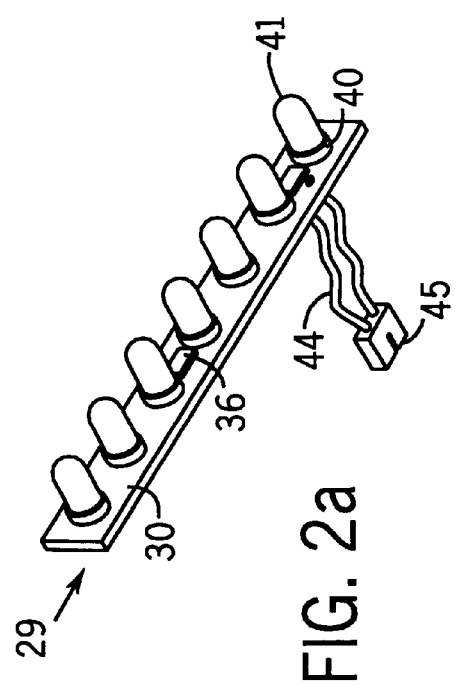
FIG. 2a is a perspective view of a rigid circuit board with light emitting diodes and current limiting resistors mounted on one side of said board.

As best seen in FIGS. 2a, 2b, 2c and 2d, the light emitting diodes 40 and current limiting resistor 36 are electrically interconnected and arranged to be installed in the light tube 12. The circuit board 29 has a top side 31, a bottom side 32 and at least one such side supports a circuit trace 33 for electrically connecting the various electrical components of the light apparatus 10. The circuit trace 33 is typically made out of 2 oz. copper and placed on both the top side 31 and bottom side 32 of the circuit board. The Applicant has determined that the circuit trace 33 can be about 50 mil. wide to allow conduction of between 7–8 amperes of current for a convenient length of light tube 12. A physical constraint must be considered to provide sufficient space for the light emitting diodes 40 and the current limiting resistors 36 mounted on the circuit board 29 as shown in FIGS. 2a and 2b. A plurality of circuit boards 29, as shown in FIG. 2c, with each circuit board supporting a light emitting diode 40, can also be used. As illustrated in FIG. 2c, the light emitting diodes are the surface mount type. The diodes 40 are electrically interconnected and in series with a current limiting resistor 36. FIG. 2d illustrates another embodiment in which the light emitting diodes 40 are electrically interconnected without a circuit board with a current limiting resistor 36 selectively electrically interconnected with the diodes 40 and arranged to be contained in the interior space 16 of the light tube 12.

The diodes 40 can be the type that use a lens 41 (T-1 or T-1 ¾) or are of the surface mount type 42. In some applications the Applicant has found that the T-1 and T-1 ¾ type can be cut off near the internal semiconductor chip and then polished. This configuration is referred to as flat topping. Such configuration would be useful if the application required a light tube 12 geometry that would not accommodate a full size T-1 or T-1 ¾ LED. The Applicant uses a white light light emitting diode manufactured by Nichia America as part numbers NSPW310AS and NSPW510S, however other types of light emitting diodes that produce various colored light can be used. Color variations can also be obtained by changing the color or tint of the envelope 14 of the light tube 12. FIG. 3a illustrates a typical configuration of light emitting diodes 40 and current limiting resistors 36 in the light apparatus 10. Three LEDs are in series with one resistor which in turn are in parallel with similar groupings of components. The number of groupings of components in a single light tube 12 is dependent on the specific application. In addition, several light tubes 12 can be electrically connected, in series or parallel, depending on the application. The Applicant chose this configuration to provide flexibility in design as well as allow portions of the light tube 12 light luminosity to reduce without attaining complete darkness as would be the case in existing incandescent or gas discharge lighting appliances.

Referring to FIG. 1, the light tube 12 is electrically connected to a dimming module 50 by means of a wire 44 and connector 45 arrangement. The electrical connection can be of any convenient or conventional manner. The dimming module 50 is electrically connected to the vehicle source of electrical power 80. The purpose of the dimming module is to control the illumination intensity of the light emitting diodes 40. The dimming module 50 can be of the voltage regulator type 60 as illustrated in FIG. 3b or the voltage converter type 51 as illustrated in FIG. 3c.

One embodiment of the present invention utilizes a voltage regulator 60 for dimming the light emitting diodes 40 and controlling illumination intensity of said diodes. The voltage regulator 60 is electrically connected to the power supply 80 at the input 76 to the light apparatus 10 and to a feedback circuit 65, which in turn provides the output 74 to the light tube 12. The feedback circuit 65 comprises a variable resistor 64 electrically connected to a resistor 63 and capacitor 72 combination. The variable resistor 64 is selected to establish a minimum and maximum voltage level for the dimming requirements of the particular application of the light apparatus 10. A typical application of the light apparatus 10 of the present invention utilizes the voltage regulator 60 type dimming module 50 where low power requirements or small runs, ie. short light tubes 12, are appropriate.

Another embodiment of the present invention utilizes a voltage converter 51 for dimming the light emitting diodes 40 and controlling illumination intensity of said diodes. The voltage converter 51 is electrically connected to the power supply 80 at the input 76 to the light apparatus 10 and to a feedback circuit 66 which in turn provides the output 74 to the light tube 12. The voltage converter can be a converter selected from a group consisting of a DC-DC type, an AC-DC type and a DC-AC type. The specific type of converter 51 selected is based on the specific application of the lighting apparatus 10. A typical voltage converter 51 will have a plus sense connection 52, a negative sense connection 53 and a trim connection 54. The present invention utilizes a feedback circuit 66 that provides a resistor network including a resistor 56 connected to the plus sense connection 52, a resistor 57 connected to the negative sense connection 53 and a resistor 58 connected to the trim connection 54, which network is connected to a variable resistor 70 and a capacitor 72 to form the feedback circuit 66. A small current is fed back from the trim connection 54 to the plus sense connection 52 and the negative sense connection 53 through the variable resistor of the resistor network thereby controlling the illumination intensity of the light emitting diodes 40 in the light tube 12.

The dimming module 50 establishes, through the circuit design, ie. selection of resistor, capacitor and either voltage regulator or voltage converter, a window of operating voltage that will operate the light emitting diodes 40. The operating voltage window includes the "turn on" voltage of the type of diodes being used. When the specific "turn on" voltage is exceeded, current will flow through the light emitting diodes 40 and they will emit light. The illumination intensity of the light emitting diodes is thus controlled within the operating voltage window and adjusted, as needed, by the variable resistor in the specific feedback circuit being used.

The invention is not intended to be limited to the preferred embodiments described above, but rather is intended to be limited only by the claims set out below. Thus, it should be apparent that there has been provided in accordance with the present invention a lighting apparatus that satisfies the objectives and advantages set forth above. Although the invention has been described in conjunction with specific embodiments thereof, it is evident that many alternative, modifications and variations will be apparent to those skilled in the art. Accordingly, it is intended to embrace al such alternatives, modifications, and variations that fall within the spirit and broad scope of the appended claims.

I claim:

1. A lighting apparatus for illuminating vehicle interiors and powered by a source of electrical power provided by the vehicle, said lighting apparatus comprising:

a light tube with an interior space and having at least one circuit board channel, a circuit board installed in the circuit board channel with said circuit board having a top side and a bottom side with either of said sides supporting a circuit trace forming a circuit connection, a plurality of light emitting diodes mounted on the circuit board in electrical contact with the circuit trace a plurality of current limiting resistors mounted on the circuit board in electrical contact with the circuit trace and in series with said light emitting diodes, and a dimming module having a voltage regulator electrically connected to the vehicle source of electrical power, and having a feedback circuit connected to the voltage regulator and to the circuit trace on the circuit board whereby illumination intensity of the light emitting diodes can be varied.

2. The lighting apparatus of claim 1 wherein the dimming module comprises a voltage converter electrically connected to the vehicle source of electrical power and to said a feedback circuit.

3. The lighting apparatus of claim 2 wherein the voltage converter is a converter selected from a group consisting of a DC-DC type, an AC-DC type and a DC-AC type.

4. The lighting apparatus of claim 1 wherein the light emitting diodes produce white light.

5. The light apparatus of claim 1 wherein the circuit board is flexible.

6. The lighting apparatus of claim 1 wherein the light emitting diodes and the current limiting resistors are surface mounted on the circuit board.

7. The lighting apparatus of claim 1 wherein the light tube is flexible.

8. The lighting apparatus as recited in claim 1 wherein the plurality of light emitting diodes are divided into a plurality of groups each having at least two light emitting diodes connected in series and with the plurality of groups being connected in parallel.

9. The lighting apparatus as recited in claim 8 each of the plurality of resistors is connected in series with a different one of the plurality of groups of light emitting diodes.

10. A lighting apparatus for illuminating vehicle interiors and powered by a source of electrical power provided on the vehicle, said lighting apparatus comprising:

a light tube with an interior space, a plurality of circuit boards contained within the interior space and electrically interconnected, with each circuit board having a circuit trace thereon, a least one light emitting diode mounted on each circuit board in electrical contact with the circuit trace a plurality of current limiting resistors selectively mounted on the circuit boards in electrical contact with the circuit trace and in series with said light emitting diodes, and a dimming module having a voltage regulator electrically connected to the vehicle source of electrical power, and having a feedback circuit connected to the voltage regulator and to the circuit trace on the circuit board whereby illumination intensity of the light emitting diodes can be varied.

11. The lighting apparatus of claim 10 wherein the dimming module comprises a voltage converter electrically connected to the vehicle source of electrical power and said a feedback circuit.

12. The lighting apparatus of claim 11 wherein the voltage converter is a converter selected from a group consisting of a DC-DC type, an AC-DC type and a DC-AC type.

13. The lighting apparatus of claim 10 wherein the light emitting diodes produce white light.

14. The lighting apparatus of claim 10 wherein the light emitting diodes and the current limiting resistors are surface mounted on the circuit board.

15. The lighting apparatus of claim 10 wherein the light tube is flexible.

16. A lighting apparatus for illuminating vehicle interiors and powered by a source of electrical power provided on the vehicle, said lighting apparatus comprising:

a light tube with an interior space, a plurality of light emitting diodes electrically interconnected and contained within said interior space, a plurality of current limiting resistors selectively electrically interconnected with said diodes and contained within said interior space, and a dimming module in electrical contact with the diodes and resistors in said tube and with the vehicle source of electrical power, wherein illumination intensity of the light emitting diodes can be varied, a dimming module in electrical contact with the light emitting diodes and resistors in said tube, said dimming module having a voltage regulator electrically connected with the vehicle source of electrical power, and having a feedback circuit connected to the voltage regulator and to the light emitting diodes whereby illumination intensity of the light emitting diodes can be varied.

17. The lighting apparatus of claim 16 wherein the dimming module comprises a voltage converter electrically connected to the vehicle source of electrical power and said a feedback circuit.

18. The lighting apparatus of claim 16 wherein the voltage converter is a converter selected from a group consisting of a DC-DC type, an AC-DC type and a DC-AC type.

19. The lighting apparatus of claim 16 wherein the light emitting diodes produce white light.

20. The lighting apparatus of claim 16 wherein the light tube is flexible.

21. The lighting apparatus as recited in claim 19 wherein the plurality of light emitting diodes are divided into a plurality of groups each having at least two light emitting diodes connected in series and with the plurality of groups being connected in parallel.

22. The lighting apparatus as recited in claim 21 each of the plurality of resistors is connected in series with a different one of the plurality of groups of light emitting diodes.

* * * * *